Patented June 1, 1943 2,320,831

UNITED STATES PATENT OFFICE 2,320,831

DOUGHNUT SUGAR

John W. Schlegel and Louis Lang, New York, N. Y., assignors to The National Sugar Refining Company, Edgewater, N. J., a corporation of New Jersey No Drawing. Application June 4, 1940, Serial No. 338,758

7 Claims. (Cl. 99—92)

This invention shortens the process of manufacturing doughnuts and improves the product. It consists of a prepared sugar for dusting doughnuts to complete their manufacture and has the advantage that the doughnuts can be dusted after being removed from the frying bath and drained, without waiting for them to cool as heretofore, thus shortening the process, and that when dusted they preserve their snowy whiteness for an indefinite time, appearing freshly made even after many days, thus improving the product.

Doughnuts dusted with the sugar or sugar compositions heretofore employed quickly lose their fresh appearance, due to the absorption by the sugar of grease or moisture, or both, from the doughnut and to some extent also by absorption of atmospheric moisture. This gives the doughnut a disagreeable mottled, moist or greasy appearance or feel, and such change occurs at once if the dusting is attempted while the doughnut is still hot from the kettle. Goods which have thus deteriorated in appearance are, of course, less attractive to the customer and are generally counted as loss by the manufacturer.

This invention is based on our discovery that dusting sugar can be effectively insulated against such absorption and deterioration and that this can be accomplished by a simple procedure and without in any way impairing the powdery or dusty nature of the sugar or affecting its appearance, or its edible properties.

We accomplish this result by treating the sugar with wax. We can use any one or more of the edible true waxes which have the appropriate melting point and we have found that beeswax, carnauba wax, and sugar-cane wax are all well adapted for the purpose. These substances melt in the range between 140° and 200° F. We prefer beeswax, more particularly bleached beeswax, since that is nearly white and is neutral in flavor, and we have found that an extremely small proportion of such wax, as low at 0.4 per cent. of the weight of the sugar, will suffice to render the sugar grease and moisture repellent. Such a small quantity has no effect whatever on the appearance of the sugar, which can be either the usual sugar (sucrose), commonly used for dusting foods, or any of the other sugars, including lactose, dextrose, maltose and levulose.

The wax can be applied to or combined with the sugar by placing the latter in a steam-jacketed stirring receptacle of the kind having an inside stirrer and scraper and supplied with steam at about 10 pounds pressure which raises the sugar to a corresponding temperature, above or about the melting point of the wax, but not sufficient to melt the sugar. The wax is melted and introduced into the receptacle, which is appropriately covered over to confine dust, and stirred until all outward evidence of the wax has disappeared. By this process each individual sugar crystal or particle becomes coated more or less with a thin film of wax, and while the appearance is not changed, the character of the sugar is definitely altered as exhibited by the fact, for example, that a spoonful of it will rest for weeks on the surface of water, at room temperature, without sinking, indicating its water-repellent property. At the same time the sugar can be dissolved by stirring it into the water indicating that although water-repellent en masse, it is still capable of solution, and indicating further that its digestibility is not impaired. Its taste also is not appreciably affected. When dusted on doughnuts, or other comestibles, such waxed sugar is not affected by the grease, even hot, and imparts the desired snowy white effect which persists even longer than the product continues to be otherwise suitable for consumption. Incidental to the non-absorption of grease, a lighter dusting than is required with the dusting sugars heretofore used gives a better effect, thus adding a saving in cost to the other advantages.

Having found that these waxes can be applied as coatings to sugars with the effects stated, we are not limited to any particular use of our new product nor to the amount of wax employed for the treatment which, for some purposes, may be desirably increased well above the percentage above given, say, up to 5% or more.

We claim:

1. Food-dusting sugar, having wax incorporated therein to the extent of about 0.4% of the weight of the sugar.

2. A food dusting sugar comprising sugar in powder-form carrying beeswax on its individual particles in quantity sufficient to render it water- and grease-repellent.

3. A food dusting sugar comprising sucrose in powder-form carrying about 0.4% of beeswax on its component particles.

4. A food dusting sugar comprising sugar in powder-form carrying carnauba wax on its individual particles in quantities sufficient to render it water- and grease-repellent.

5. A food dusting sugar comprising sugar in powder-form carrying sugar-cane wax on its individual particles in quantity sufficient to render it water- and grease-repellent.

6. A food dusting sugar consisting of powdered sugar carrying a small percentage of an edible wax on its component particles and characterized by its capability of floating on water indefinitely, its resistance to solution in hot fat and by its identity in appearance and taste to the pure powdered sugar.

7. A food dusting sugar carrying on its component particles a fractional percentage of an edible wax, of melting point in the range between 140° F. and 200° F., and characterized by its capability of floating on water indefinitely, its resistance to solution in hot fat and its identity in appearance and taste to the pure powdered sugar.

JOHN W. SCHLEGEL.
LOUIS LANG.